US007480795B2

(12) United States Patent
Vanstone

(10) Patent No.: US 7,480,795 B2
(45) Date of Patent: Jan. 20, 2009

(54) METHOD FOR THE APPLICATION OF IMPLICIT SIGNATURE SCHEMES

(75) Inventor: Scott A. Vanstone, Campbellville (CA)

(73) Assignee: Certicom Corp., Mississauga (CA)

( * ) Notice: Subject to any disclaimer, the term of this patent is extended or adjusted under 35 U.S.C. 154(b) by 0 days.

(21) Appl. No.: 11/012,595

(22) Filed: Dec. 16, 2004

(65) Prior Publication Data

US 2005/0193219 A1    Sep. 1, 2005

Related U.S. Application Data

(63) Continuation of application No. 09/589,891, filed on Jun. 9, 2000, now abandoned.

(51) Int. Cl.
*H04L 9/00* (2006.01)
(52) U.S. Cl. .................. 713/156; 713/155; 713/175; 380/278; 726/4; 726/10
(58) Field of Classification Search .............. 726/2–4, 726/17–21, 26, 263, 27–30; 380/228–229, 380/232, 282–286, 28–30, 255, 277–279, 380/44–47; 713/168, 171, 150, 156, 175–176, 713/180, 155–157, 161, 153; 705/50, 53, 705/67, 71, 75–76, 78; 707/10
See application file for complete search history.

(56) References Cited

U.S. PATENT DOCUMENTS 5,511,121 A * 4/1996 Yacobi ..................... 705/69

(Continued)

FOREIGN PATENT DOCUMENTS

| CH | 678134 | 7/1991 |
|---|---|---|
| EP | 0807911 A2 | 11/1997 |
| WO | WO PCT/CA99/00244 A1 | 9/1999 |

OTHER PUBLICATIONS

Hoger P., *Self-certified keys—Concepts and Applications*, 1997, pp. 1-15, Postdoctoral fellowship paper of the NATO Scientific Committee disseminated by the DAAD, Paris, France.

(Continued)

*Primary Examiner*—KimYen Vu
*Assistant Examiner*—Leynna T Truvan
(74) *Attorney, Agent, or Firm*—John R. S. Orange; Brett J. Slaney; Blake, Cassels & Graydon LLP.

(57) ABSTRACT

A method of verifying a transaction over a data communication system between a first and second correspondent through the use of a certifying authority. The certifying authority has control of a certificate's validity, which is used by at least the first correspondent. The method comprises the following steps. One of the first and second correspondents advising the certifying authority that the certificate is to be validated. The certifying authority verifies the validity of the certificate attributed to the first correspondent. The certifying authority generates implicit signature components including specific authorization information. At least one of the implicit signature components is forwarded to the first correspondent for permitting the first correspondent to generate an ephemeral private key. At least one of the implicit signature components is forwarded to the second correspondent for permitting recovery of an ephemeral public key corresponding to the ephemeral private key. The first correspondent signs a message with the ephemeral private key and forwards the message to the second correspondent. The second correspondent attempts to verify the signature using the ephemeral public key and proceeds with the transaction upon verification.

52 Claims, 6 Drawing Sheets

U.S. PATENT DOCUMENTS

| | | | |
|---|---|---|---|
| 5,850,442 A * | 12/1998 | Muftic | 705/65 |
| 5,884,272 A * | 3/1999 | Walker et al. | 705/1 |
| 5,937,066 A | 8/1999 | Gennaro et al. | |
| 5,953,420 A * | 9/1999 | Matyas et al. | 713/171 |
| 5,982,898 A * | 11/1999 | Hsu et al. | 713/156 |
| 6,009,177 A * | 12/1999 | Sudia | 713/191 |
| 6,058,188 A * | 5/2000 | Chandersekaran et al. | 380/286 |
| 6,091,820 A * | 7/2000 | Aziz | 380/30 |
| 6,105,006 A | 8/2000 | Davis et al. | |
| 6,202,150 B1 * | 3/2001 | Young et al. | 713/167 |
| 6,212,281 B1 | 4/2001 | Vanstone | |
| 6,226,383 B1 * | 5/2001 | Jablon | 380/30 |
| 6,230,266 B1 * | 5/2001 | Perlman et al. | 713/158 |
| 6,295,359 B1 | 9/2001 | Cordery et al. | |
| 6,298,153 B1 * | 10/2001 | Oishi | 382/186 |
| 6,335,972 B1 * | 1/2002 | Chandersekaran et al. | 380/286 |
| 6,363,480 B1 | 3/2002 | Perlman | |
| 6,424,712 B2 | 7/2002 | Vanstone et al. | |
| 6,446,207 B1 * | 9/2002 | Vanstone et al. | 713/180 |
| 6,483,921 B1 | 11/2002 | Harkins | |
| 6,490,352 B1 | 12/2002 | Schroeppel | |
| 6,490,680 B1 | 12/2002 | Scheidt et al. | |
| 6,535,978 B1 * | 3/2003 | Padgett et al. | 713/156 |
| 6,564,320 B1 | 5/2003 | De Silva et al. | |
| 6,615,350 B1 * | 9/2003 | Schell et al. | 713/168 |
| 6,772,331 B1 * | 8/2004 | Hind et al. | 713/151 |
| 6,820,063 B1 * | 11/2004 | England et al. | 705/54 |
| 6,842,523 B1 * | 1/2005 | Niwa et al. | 380/286 |
| 6,907,401 B1 * | 6/2005 | Vittal et al. | 705/26 |
| 6,950,941 B1 * | 9/2005 | Lee et al. | 713/193 |
| 7,080,404 B2 * | 7/2006 | Abdo et al. | 726/3 |
| 7,095,852 B2 * | 8/2006 | Wack et al. | 380/44 |
| 7,188,258 B1 * | 3/2007 | Aggarwal et al. | 713/194 |

OTHER PUBLICATIONS

Rivest R., *Can We Eliminate Certificate Revocation Lists?*, Feb. 1998, pp. 178-183, Financial Cryptography. International Conference.

Yung-Kao Hsu, et al., *Intranet security framework based on short-lived certificates*, Jun. 20, 1997, pp. 228-233, Proceedings of the 6th IEEE Workshops on Enabling Technologies: Infrastructure for Collaborative Enterprises, IEEE Computing Soc., Cambridge, MA, USA.

\* cited by examiner

METHOD FOR THE APPLICATION OF IMPLICIT SIGNATURE SCHEMES

This application is a Continuation of U.S. application Ser. No. 09/589,891 filed on Jun. 9, 2000 now abandoned.

This invention relates generally to cryptographic schemes, an more specially to implicit signature schemes.

BACKGROUND OF THE INVENTION

Diffie-Hellman key agreement provided the first practical solution to the key distribution problem, in cryptographic systems. The key agreement protocol allows two parties never having met in advance or sharing key material to establish a shared secret by exchanging messages over an open (unsecured) channel. The security rests on the intractability of computing discrete logarithms or in factoring large integers.

With the advent of the Internet and such like, the requirement for large-scale distribution of public keys and public key certificates is becoming increasingly important to enable systems like Diffie-Hellman key agreement.

A number of vehicles are known by which public keys may be stored, distributed or forwarded over unsecured media without danger of undetectable manipulation. These vehicles include public-key certificates, identity-based systems, and implicit certificates. The objective of each vehicle is to make one party's public key available to others such that its authenticity and validity are verifiable.

A public-key certificate is a data structure consisting of a data part and a signature part. The data part contains clear text data including as a minimum, a public key and a string identifying the party to be associated therewith. The signature part consists of the digital signature of a certification authority (CA) over the data part, effectively the encryption of the data with the CA's private key so it may be recovered with his public key, thereby binding the entities identity to the specified public key. The CA is a trusted third party whose signature on the certificate vouches for the authenticity of the public key bound to the subject entity.

Identity-based systems (ID-based system) resemble ordinary public-key systems involving a private transformation and a public transformation, but parties do not have explicit public keys as before. Instead, the public key is effectively replaced by a party's publicly available identity information (e.g. name or network address). Any publicly available information, which uniquely identifies the party and can be undeniably associated with the party, may serve as identity information. Here a trusted CA is required to finish each party with the private key corresponding to their public key.

An alternate approach to distributing public keys involves implicitly certified public keys. Here explicit user public keys exist, but they are to be reconstructed by the recipient rather than transported by explicitly signed public-key certificates as in certificate based systems. Thus implicitly certified public keys may be used as an alternative means for distributing public, keys (e.g. Diffie-Hellman keys).

With a conventional certificate, the authenticity of the information must be verified to ensure that the sender and the sender's public key are bound to one another. With an implicit certification it is simply necessary to verify the sender's signature of the message using the implicit certificate. The primary advantage of implicit certificates is the computationally expense explicit certificate verification is not required as it is in certification schemes. Further, unconditionally trusted CAs are not required as they are in ID-based schemes.

An example of an implicitly certified public key mechanism is known as Gunther's implicitly-certified public key method. In this method:

1. A trusted server T selects an appropriate fixed public prime p and generator $\alpha$ of $Z^*_p$. T selects a random integer t, with $1 \leq t \leq p-2$ and $\gcd(t,p-1)=1$, as its private key, and publishes its public key $u = \alpha^t \mod p$, along with $\alpha$, p.

2. T assigns to each party A a unique name or identifying string $I_A$ and a random integer $k_A$ with $\gcd(k_A, p-1)=1$. T then computes $P_A = \alpha^{k_A} \mod p$. $P_A$ is A's key reconstruction public data, allowing other parties to compute $(P_A)^a$ below.

3. Using a suitable hash function h, T solves the following equation for a:

$$H(I_A) \equiv t P_A + k_A a \pmod{p-1}$$

4. T securely transmits to A the pair $(r,s)=(P_A,a)$, which is T's ElGamal signature on $I_A$. (a is A's private key for a Diffie-Hellman key-agreement)

5. Any other party can then reconstruct A's Diffie-Hellman public key $P_A{}^a$ entirely from publicly available information $(\alpha, I_A, u, P_A, p)$ by computing:

$$P_A{}^a = \alpha^{H(I)}{}_A u^{-P}{}_A \mod p$$

Thus signing an implicit certificate needs one exponentiation operation, but reconstructing the ID-based implicitly-verifiable public key needs two exponentiation.

It is known that exponentiation in the group $Z^*_p$ and its analog scalar multiplication of a point in $E(F_q)$ is computationally intensive. An RSA scheme is extremely slow requiring successive squaring and multiplication operations. Elliptic curve (EC) cryptosystems are not only more robust but also more efficient by using doubling and adding operations. However, despite the resounding efficiency of EC systems over RSA type systems the computational requirement is still a problem particularly for computing devices having limited computing power such as "smart cards", pagers and such like.

Significant improvements have been made in the efficacy of certification protocols by adopting the protocols set out in Canadian patent application 2,232,936. In this arrangement, an implicitly-certified public key is provided by cooperation between a certifying authority, CA, and a correspondent A.

For each correspondent A, the CA selects a unique identity $I_A$ distinguishing the entity A. The CA generates public data $\gamma_A$ for reconstruction of a public key of correspondent A by mathematically combining a private key of the trusted party CA and a generator created by the CA with a private value of the correspondent A. The values are combined in a mathematically secure way such that the pair $(I_A, \gamma_A)$ serves as correspondent A's implicit certificate. The CA combines the implicit certificate information $(I_A, \gamma_A)$ in accordance with a mathematical function $F(\gamma_A, I_A)$ to derive an entity information f. A private key a of the correspondent A is generated from f and the private value of the correspondent A. The correspondent A's public key may be reconstructed from the public information, the generator $\gamma_A$ and the identity $I_A$ relatively efficiently.

Certificates, implicit certificates, and ID-based systems provide assurance of the authenticity of public keys. However, it is frequently necessary to verify the status of the public key to ensure it has not been revoked by the CA.

Several solutions are known to this revocation problem, the most common bein the use of certificate revocation lists (CRLs). Each CA maintains a CRL which contains the serial number of revoked certificates and is signed by the CA using its private key. When a recipient receives a message that has been secured with a certificate, the recipient will recover the serial number, and check the CRL.

Typically, therefore, the correspondent A will sign a message m with a private key, a, and forward it together with a certificate from the CA that binds the sender A and the public key aP. The recipient B checks the certificate and verifies the signature on the message m. The correspondent B will then ask the CA whether the certificate is valid and receives a message signed by the CA confirming the status of the certificate at a particular time. The correspondent B will then verify the signature on the CA's message and proceed accordingly to accept or reject the message sent by correspondent A.

During this process it is necessary for correspondent A to perform one signature, for the CA to perform one signature, and for the recipient B to verify three signatures.

CAs may also issue authorization or attributable certificates in addition to public-key certificates. In this case the certificate issued by the CA to the correspondent A has a certain expiry or has details such as a credit limit or access rights to certain programs.

However with each arrangement, verification of the certificates is necessary as the information contained in the certificate may change periodically, even within the life of the certificate.

Furthermore, a correspondent may wish to be recertified. This is particularly true if the correspondent has reason to believe that its implicit public key has been compromised. However, recertification is a costly process that requires the correspondent to regenerate its private key, securely communicate its private key with the CA, and regenerate the data for constructing and reconstructing the implicit public key.

Accordingly, there is a need for a technique that simplifies the verification and recertification of certificates issued by a certifying authority and it is an object of the present invention to provide a technique that obviates or mitigates the above disadvantages.

SUMMARY OF THE INVENTION

In accordance with an embodiment of the present invention there is provided a method of verifying a transaction over a data communication system between a first and second correspondent through the use of a certifying authority. The certifying authority has control of a certificate's validity, which is used by at least the first correspondent. The method comprises the following steps. One of the first and second correspondents advising the certifying authority that the certificate is to be validated. The certifying authority verifies the validity of the certificate attributed to the first correspondent. The certifying authority generates implicit signature components including specific authorization information. At least one of the implicit signature components is forwarded to the first correspondent for permitting the first correspondent to generate an ephemeral private key. At least one of the implicit signature components is forwarded to the second correspondent for permitting recovery of an ephemeral public key corresponding to the ephemeral private key. The first correspondent signs a message with the ephemeral private key and forwards the message to the second correspondent. The second correspondent attempts to verify the signature using the ephemeral public key and proceeds with the transaction upon verification.

BRIEF DESCRIPTION OF THE DRAWINGS

Embodiments of the present invention will now be described by way of example only with reference to the accompanying drawings in which.

DETAILED DESCRIPTION OF THE PREFERRED EMBODIMENT

Figure 1:
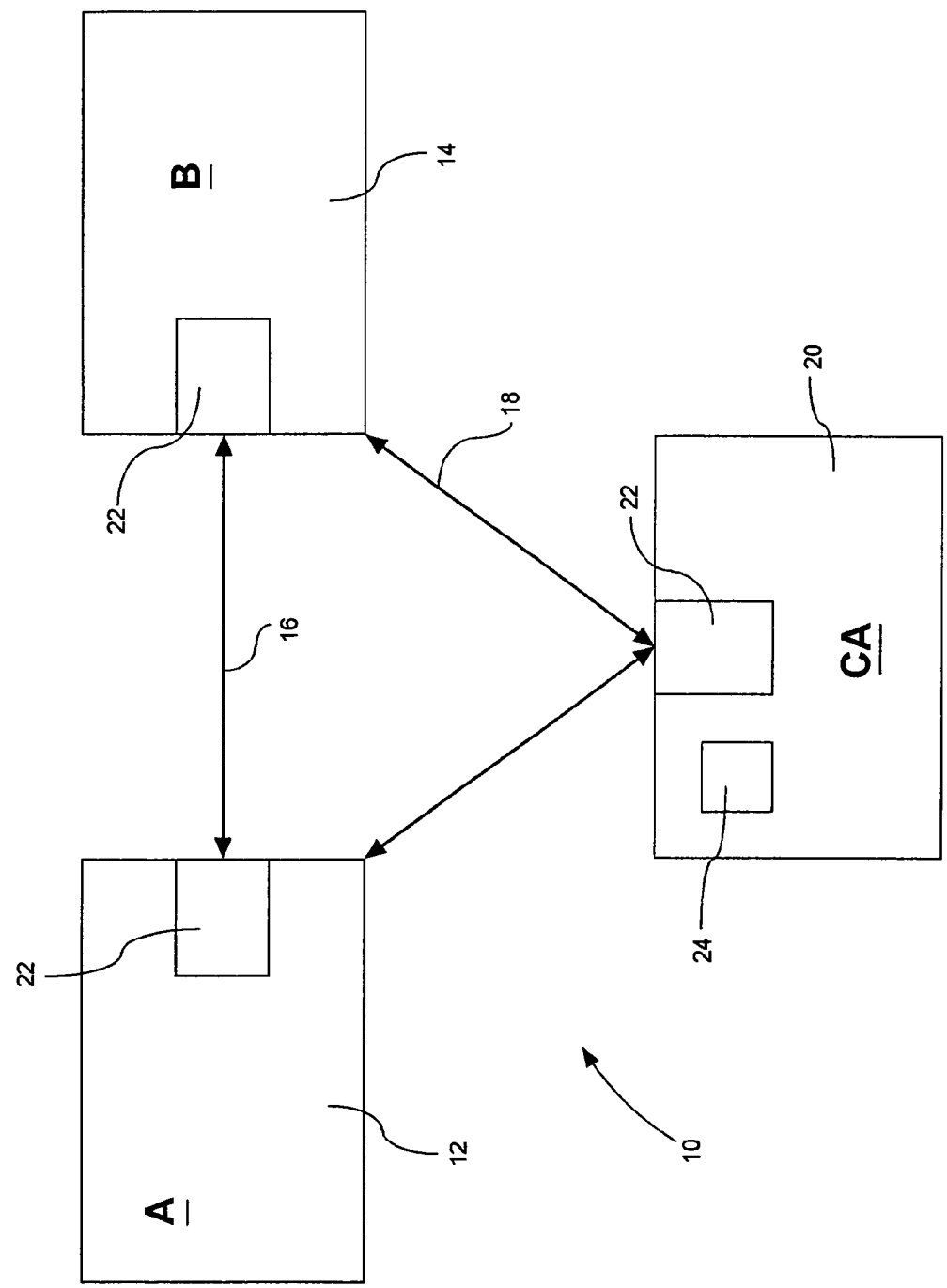
FIG. 1 is a schematic representation of a data communication system.
Figure 2:
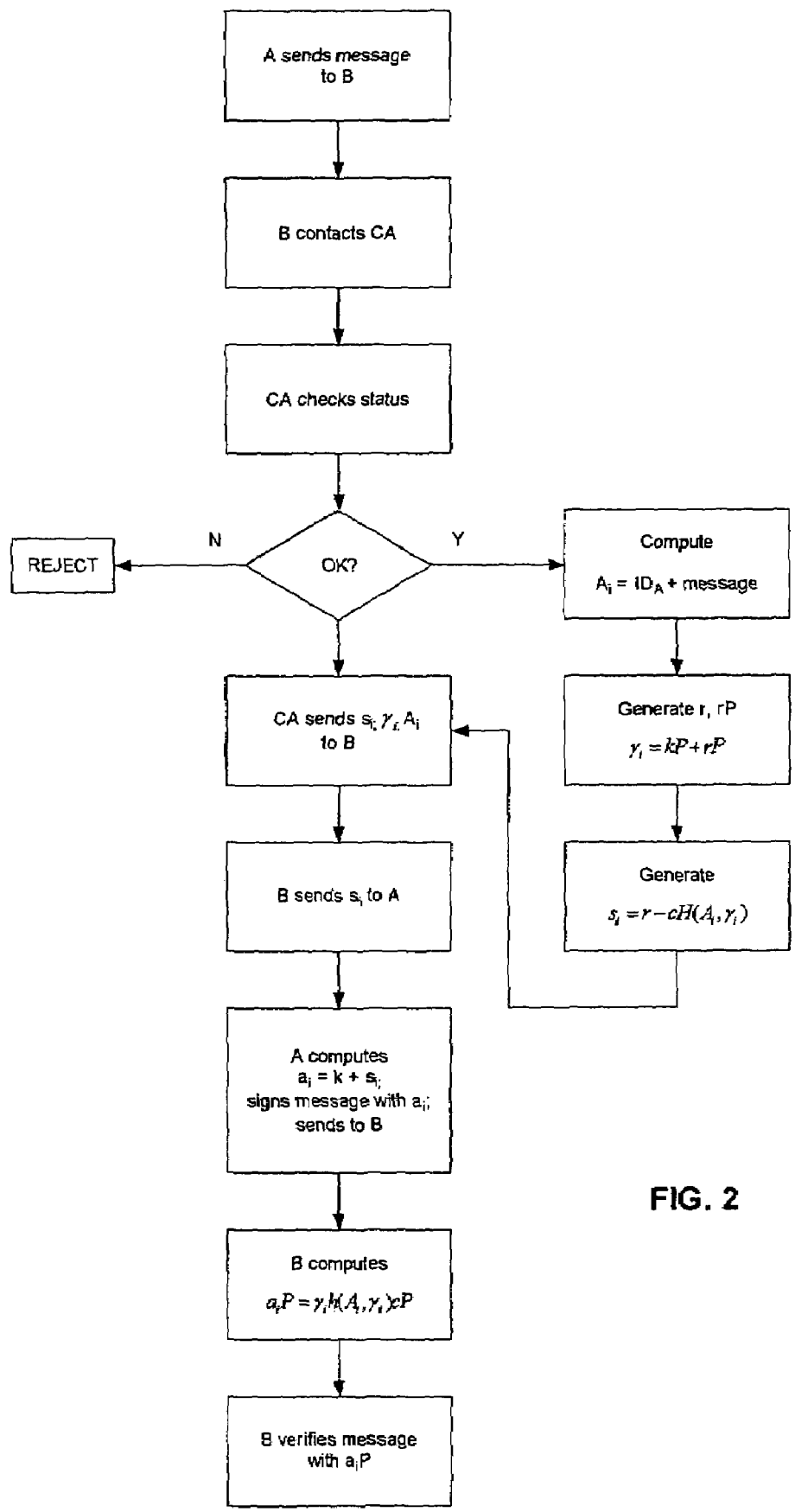
FIG. 2 is a flow chart illustrating the exchange of information conducted on the system of FIG. 1 in a first embodiment.

Referring therefore to FIG. 1, a data communication system 10 includes a pair of correspondents A, B, respectively identified as 12, 14, interconnected by a communication link 16. The correspondent B, 14, is also connected by a communication link 18 to a certifying authority, CA, indicated at 20. It will be appreciated that the links 16, 18 are typically telephone lines or wireless links allowing the parties to route messages to intended recipients.

Each of the correspondents, 12, 14 and certifying authority 20 incorporate cryptographic units 22 that perform public-key cryptographic functions under the control of cryptographic software that may be embodied on a data carrier or programmed in an integrated circuit. Such implementations are well known and need not be described in detail, except to the extent necessary to appreciate the operation of the exchange of messages. For the purpose of this description it is assumed that each of the units 22 implement an elliptic curve public-key cryptosystem (ECC) operating in a field defined over $F(q)$ but it will be appreciated that other implementations, such as those using $Z \cdot_p F \cdot_p$, the multiplicative group of integers modulo a prime may be used.

The parameters for the ECC are an underlying cubic curve and a defined point P on the curve. The correspondent A has an identity, $ID_A$, a short term or ephemeral private key k and a corresponding public key kP. The CA 20 is advised of the public key kP and identity $ID_A$ which conveniently remain the same for all correspondence originating from the correspondent A.

To initiate an exchange of a message, m, for example a transaction record, between correspondents A and B, the message is sent by correspondent A to correspondent B over the communication channel 16. The message m is sent in the clear or in any other manner that may be read by correspondent B.

The correspondent B advises the certifying authority CA 20 that he has received a message from correspondent A and may also include some additional information relating to the nature of the transaction. This may be performed on a dedicated channel or may be encrypted if the information is considered to be of a sensitive nature. Upon receiving the information from correspondent B, the CA 20 checks the record of correspondent A and, if in order, prepares to return to the correspondent B the implicit certificate components, 24, identified as $s_i$, $\gamma_i$ and $A_i$.

The component $A_i$ includes the identity of A, i.e. $ID_A$, typically a unique distinguishing name or identity, for example a name, address or phone number that is stored by the CA 20 and a time stamp, message or similar transaction specific information.

The CA 20 also generates a random integer r and computes a corresponding public key rP. The value of $\gamma_i$ is then computed from the relationship that $\gamma_i=kP+rP$.

The value of $s_i$ is then computed from the relationship that $s_i=r-c \cdot H(A_i,\gamma_i)$ where c is a long term secret key of the CA 20, and H indicates a secure hash function such as SHA 1.

The CA 20 forwards $s_i$, $\gamma_i$, and $A_i$ to correspondent B. Since $A_i$ contains transaction specific information, the implicit signature components are also transaction specific. It is preferable, but not necessary, that the CA signs the signature components forwarded to correspondent B.

Correspondent B, upon receipt of the communication from the CA 20, forwards the certificate component $s_i$ to the correspondent A. It is preferable, but not necessary, that correspondent B signs the certificate component sent to correspondent A. The correspondent A computes a transaction specific private key $a_i$ from the relationship $a_i=k+s_i$. The message m is then signed with the computed private key $a_i$ and returned to the correspondent B.

The correspondent B then recovers the value corresponding to the transaction specific public key, $a_iP$, from the values of $\gamma_i$ and $A_i$ received from the CA 20. The public key $a_iP$ can be computed from $a_iP=\gamma_i-H(A_i,\gamma_i)\cdot cP$, where cP is the public key of the CA 20, and checks the signature on the message m. If it verifies then the message is accepted and the transaction completed.

The implementation described above maintains a relatively small size of certificate and reduces the work performed by the correspondents A and B. The CA 20 is required to perform one implicit signature per transaction and correspondent B only requires one implicit signature verification and two signature verifications per transaction. Whereas prior proposals would require the CA 20 to return a message to the correspondent B stating that correspondent A has a valid certificate, this is avoided in the present embodiment by sending transaction specific implicit certificate components.

As described above, a common key kP is used for each transaction by correspondent A but if preferred a different key kP may be used to inhibit tracing of transactions originating at correspondent A. In this case new values of kP are sent to the CA 20 offline with appropriate levels of security.

Figure 3:
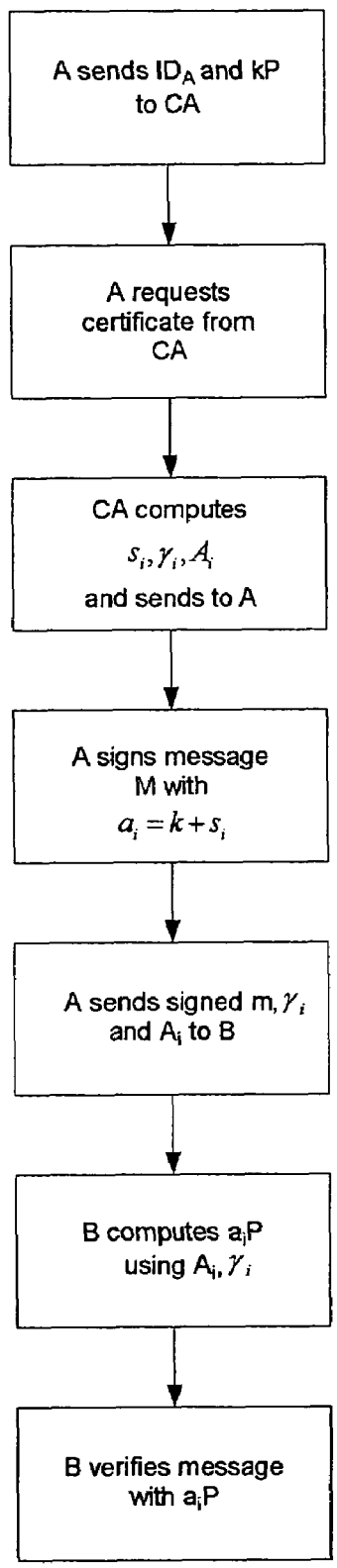
FIG. 3 is a flow chart illustrating the exchange of information conducted on the system of FIG. 1 in a second embodiment.

An alternative arrangement is shown in FIG. 3, wherein like numerals with a prefix "1" refer to similar components as those of FIG. 1, in which the originator of the message, correspondent A, communicates directly with the CA 120 who has previously been provided with the identity $ID_A$ and the public key kP. In this arrangement the correspondent A notifies the CA 120 that a certificate is required. The CA 120 generates a certificate with components $s_i$, $\gamma_i$, $A_i$ as before. The correspondent A then computes the transaction specific private key $a_i=k+s_i$ and uses it to sign the message m. The signed message is forwarded together with the explicit signature components $\gamma_i$ and $A_i$ to the correspondent B.

The correspondent B recovers the public key $a_iP$ from $A_i$ and $\gamma_i$ and checks the signature on the message m. The transaction specific information in the component $A_i$ is checked to determine if it is as expected. Verification of the transaction specific information after it has been recovered is known in the art and depends on the type of information being verified. If both the signature and the information are verified then the transaction is accepted.

Alternately, the CA 120 could send $s_i$ to correspondent A and $\gamma_i$, $A_i$ to correspondent B. Correspondent A can then sign message m using the private key $d_i=a+s_i$ and forward the message and signature to correspondent B.

Figure 4:
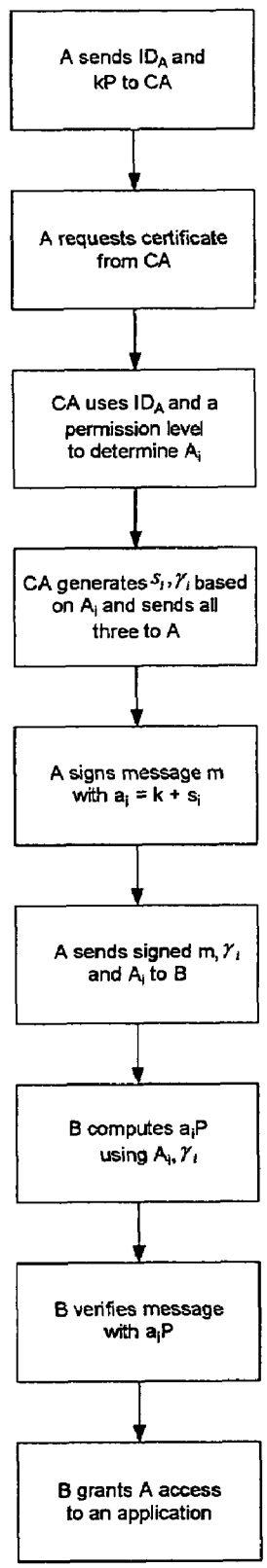
FIG. 4 is a flow chart showing a third embodiment of the system of FIG. 1.

The above protocol may also be used to provide implicit attributable certificates as shown in FIG. 4, wherein like numerals with a prefix "2" refer to similar components as those of FIG. 1. Initially the values of $ID_A$ and kP are transferred to the CA 220 from correspondent A. A request is then sent from correspondent A to the CA 220 to gain access to a particular application controlled by B.

The CA 220 generates a certificate including $A_i$, $\gamma_i$ and $s_i$ with $A_i$ including the $ID_A$ and an indication that the correspondent A can use a particular application and sends the certificate to A. A value of $a_i=k+s_i$ is generated by the correspondent A and used to sign the message m. The signed message is forwarded to correspondent B together with $\gamma_i$ and $A_i$ who recovers the corresponding public key $a_iP$. The signature is then checked and, if it verifies, access is given to the application. If the signature does not verify, the request is returned.

The above implicit attributable certificate is efficient in that it only requires one signed certificate and by using different public keys per application is hard to trace to a particular user. Moreover, the identity and the specific attributable certificate can be incorporated into one certificate rather than the two normally required.

Figure 5:
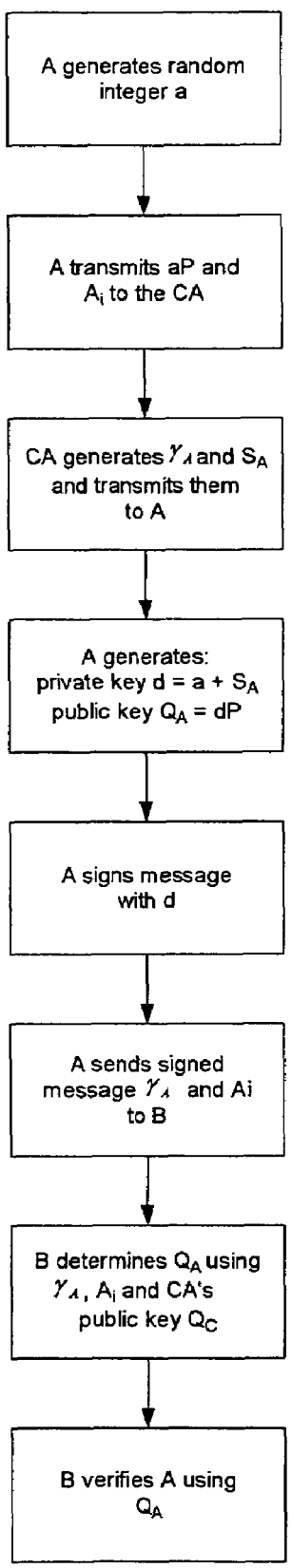
FIG. 5 is a flow chart showing a fourth embodiment of the system of FIG. 1.

Yet an alternate embodiment, similar to that illustrated in FIG. 3, is shown in FIG. 5. The CA 120 has a private key, c, and a public key, $Q_C=cP$. In order to acquire a certificate, correspondent A first generates a random integer, a. Integer a is used to compute a value aP, which is sent to the CA 120 along with correspondent A's identity, $ID_A$ or, alternately, $A_i$ (which may contain $ID_A$).

Upon receiving aP and $ID_A$ from correspondent A, the CA 120 generates a random integer $c_A$ and uses it to calculate correspondent A's certificate, $\gamma_A=aP+c_AP$. The CA 120 also calculates $s_A=h(\gamma_A\|ID_A\|cP)c+c_A$ (mod n). The certificate, $\gamma_A$ and $s_A$ are sent to correspondent A. Correspondent A's private key then becomes $d=a+s_A$, and its public key becomes $Q_A=dP$. Correspondent A's public key can be derived from the certificate according to the equation $Q_A=h(\gamma_A\|ID_A\|cP)Q_C+\gamma_A$.

Therefore, if correspondent A wants to sign a message, m, to send to correspondent B, correspondent A does so using the private key, d. Correspondent A then sends the signed message along with the certificate, $\gamma_A$, and identification, $ID_A$. Upon receiving the information sent from correspondent A, correspondent B uses the certificate and identification along with the CA's public key, $Q_C$, for deriving correspondent A's public key, $Q_A$. The message is accepted if the signature is verified using correspondent A's derived public key, $Q_A$.

In the present embodiment, it is possible for the CA to efficiently recertify correspondent A. The CA generates a random number, $\overline{c_A}$ and computes $\overline{c_A}P$. Using the original value of aP received from correspondent A, the CA generates a new certificate, $\overline{\gamma_A}=\overline{c_A}P+aP$ and a new $\overline{s_A}=h(\overline{\gamma_A}\|ID_A\|cP)c+\overline{c_A}$ (mod n). The certificate, $\overline{\gamma_A}$, and $\overline{s_A}$ are sent to correspondent A. Therefore, correspondent A has a new private key, $\overline{d}=a+\overline{s_A}$, and a new certificate, $\overline{\gamma_A}$. Therefore, correspondent A's new public key, $Q_A$, can be derived according to $\overline{Q_A}=h(\overline{\gamma_A}\|ID_A\|cP)Q_C+\overline{\gamma_A}$.

Using such a recertification process can recertify correspondent A without requiring correspondent A to change its private key. However, this scheme requires sufficient bandwidth to send both $s_A$ and $\gamma_A$ to correspondent A. Furthermore, for each correspondent (such as correspondent A), the CA has to perform a point multiplication to obtain the new certificate, $\gamma_A$.

Figure 6:
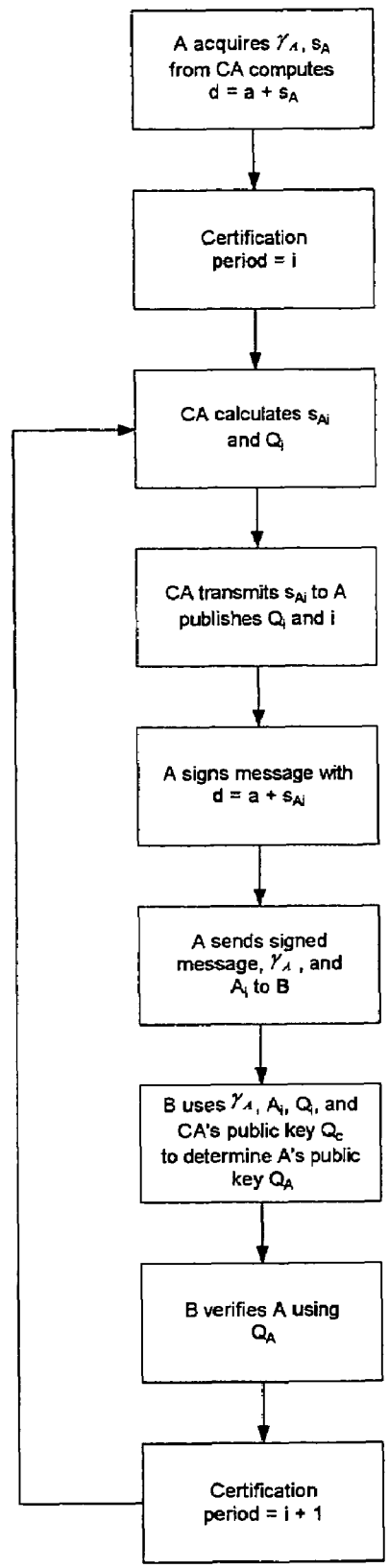
FIG. 6 is a flow chart showing a fifth embodiment of the system of FIG. 1.

However, it is possible to make a modification to the recertification process as, described above such that it is more efficient and requires less bandwidth. In the following example illustrated in FIG. 6, the CA recertifies all correspondents (including correspondent A). Also, it is assumed that correspondent A has been previously certified, acquired the certificate, $\gamma_A$, from the CA and determined the private key $d=a+s_A$.

The CA certifies the correspondents at the expiration of a certification period. For an $i^{th}$ certification period, the CA generates a random value $k_i$ and computes the value $Q_i=k_iP$. For each correspondent such as correspondent A, the CA computes $r_i=h(\gamma_A\|ID_A\|cP\|k_iP\|i)$ and then $s_{A_i}=r_ic+k_i+c_A$ (mod n). Since the certificate does not change, it is only necessary for the CA to send $s_{A_i}$ to correspondent A. The private key for correspondent A becomes $d_i=a+s_{A_i}$ and the certificate remains $\gamma_A$. The CA makes $Q_i$ and $i$ publicly available.

Therefore, it is possible to reconstruct correspondent A's public key, $d_iP$, by computing $r_i$, and then calculating $d_iP=r_iQ_C+\gamma_A+Q_i$. Correspondent A communicates with correspondent B similarly to the situation previously described. If correspondent A wants to sign a message to send to correspondent B, correspondent A does so using the private key, $d_i$. Correspondent A then sends the signed message along with the certificate, $\gamma_A$, and identification $ID_A$. Upon receiving the information sent from correspondent A, correspondent B uses the certificate and identification along with the CA's public keys, $Q_C$ and $Q_i$, for deriving $r_i$. The values $r_i$, $Q_C$, $Q_i$, and $\gamma_A$ are then used for deriving correspondent A's public key. The message is accepted if the signature is verified using correspondent A's derived public key.

Thus it can be seen that correspondent A's certificate does not change. Therefore, the CA is only required to send $s_i$ and i to correspondent A for recertification, which requires essentially half the bandwidth of sending $s_A$ and $\gamma_A$ as in the previous example. Further, although the CA has to calculate $Q_i=k_iP$ for the ith certification period, the calculation is amortized over all the correspondents. That is, the CA only has to do one point multiplication for all the correspondents (for the calculation of $Q_i$). The CA also has to perform one modular multiplication for each correspondent (while calculating $s_{A_i}$) This results in a more efficient process than previously described wherein the CA has to perform one point multiplication and one modular multiplication for each correspondent.

Since the recertification scheme described above is not a costly operation for the CA, the CA could recertify correspondents more frequently than if traditional schemes are implemented. Therefore, one application of this recertification scheme is to replace revocation lists. Instead of providing a list of revoked certificates, the CA recertifies only those certificates that are still valid and have not been revoked.

In an alternate embodiment, the certificates as described in the previous embodiments are embedded into an RSA modulus itself. For an RSA encryption algorithm, correspondent A is required to provide a public key pair, (n, e), where n is the modulus and e is the public exponent. The modulus is defined as n=pq where p and q are large prime numbers. The public exponent is selected as $1<e<\phi$, where $\phi=(p-1)(q-1)$. It has been shown that a portion of the modulus can be set aside to have a predetermined value without increasing the vulnerability of the key. This method is described in detail in U.S. Ser. No. 08/449,357 filed May 24, 1995, which is hereby incorporated by reference.

Embedding the certificate into the modulus reduces the bandwidth requirements since the certificate is included as part of the modulus instead of in addition to it This implementation is particularly useful for a CA who signs using RSA and certifies using ECC. For example, a 2048-bit RSA modulus can easily contain a 160-bit ECC certificate.

Although the invention has been described with reference to certain specific embodiments, various modifications thereof will be apparent to those skilled in the art without departing from the spirit and scope of the invention as outlined in the claims appended hereto.

The invention claimed is:

1. A method of verifying a transaction over data communication system between a first and second correspondent through the user the use of a certifying authority having control of a public key's validity, said public key being used by at least said first correspondent, said method comprising the steps of:
    a) one of said first and second correspondents advising said certifying authority validate said public key;
    b) said certifying authority verifying the validity of said public key attributed to said first correspondent;
    c) said certifying authority generating implicit certificate components including a first component comprising transaction specific information particular to said request in step a), a second component computed using said public key of said first correspondent, and a third component computed from said first and second correspondents and a private key of said certifying authority;
    d) forwarding to said first correspondent at least said third component of said implicit certificate components for permitting said first correspondent to generate a transaction specific private key using said third component;
    e) forwarding to said second correspondent at least said first and second components of said implicit certificate components for permitting recovery of transaction specific public key corresponding to said transaction specific private key using said first and second components and a public key of said certifying authority;
    f) said first correspondent signing a message with said transaction specific private key and forwarding said message to said second correspondent; and
    g) said second correspondent attempting to verify said message using said transaction specific public key and proceeding with said transaction upon verification.

2. A method as defined in claim 1, wherein said second correspondent advises said certification authority that said certificate is to be validated upon receiving an initial message from said first correspondent.

3. A method as defined in claim 2, wherein said at least one of said implicit signature components is forwarded to said second correspondent by said certifying authority.

4. A method as defied in claim 3, wherein said at least one of said implicit signature components is forwarded to said first correspondent by said second correspondent.

5. A method as defined in claim 4, wherein said
    second component is $\gamma_i$, where $\gamma_i=kP+rP$, and where k is a long term private key of said first correspondent, r is a random integer generated by said certification authority, and P is a point on a curve; and
    said third component is $s_i$, where $s_i=r-c\cdot H(A_i, \gamma_i)$, and where c is a long term private key of said certifying authority, said first component is $A_i$ and includes at least one distinguishing feature of said first correspondent and said transaction specific information, and H indicates a secure hash function;
wherein said long term private key of said first correspondent is sent to said certifying authority prior to said verification transaction.

6. A method as defined in claim 5, wherein $A_i$, $\gamma_i$, and $s_i$ are forwarded to said second correspondent and $s_i$ is forwarded to said first correspondent.

7. A method as defined in claim 5, wherein said distinguishing feature includes at least one of a name of said first correspondent, a telephone number of said first correspondent, and an address of said first correspondent.

8. A method as defined in claim 5, wherein said transaction specific information includes at least one of a time of said transaction and a date of said transaction.

9. A method as defined in claim 6, wherein said ephemeral private key is generated according to $a_i = k + s_i$, where $a_i$ is said ephemeral private key.

10. A method as defined in claim 9, wherein said ephemeral public key is recovered according to $a_i P = \gamma_i - H(A_i, \gamma_i) \cdot cP$, where $a_i P$ is said ephemeral public key and $cP$ is said certifying authority's public key.

11. A method as defined in claim 10, wherein said certifying authority verifies the validity of said certificate attributed to said first correspondent by checking a list for determining if said certificate has been revoked.

12. A method as defined in claim 10, wherein said ephemeral private key is said transaction specific private key and said ephemeral public key is said transaction specific public key.

13. A method as defined in claim 2, wherein said first correspondent advises said certification authority that said public key is to be validated.

14. A method as defined in claim 1, wherein said at least one of said implicit signature components is forwarded to said first correspondent by said certifying authority.

15. A method as defined in claim 14, wherein said at least one of said implicit signature components is forwarded to said second correspondent by said first correspondent.

16. A method as defined in claim 15, wherein said
second component is $\gamma_i$, where $\gamma_i = kP + rP$, and where k is a long term private key of said first correspondent, r is a random integer generated by said certification authority, and P is a point on a curve; and
said third component is $s_i$, where $s_i = r - c \cdot H(A_i, \gamma_i)$, and where c is a long term private key of said certifying authority, said first component is $A_i$ and includes at least one distinguishing feature of said first correspondent and said transaction specific information, and H indicates a secure hash function;
wherein said long term private key of said first correspondent is sent to said certifying authority prior to said verification transaction.

17. A method as defined in claim 16, wherein $A_i$, $\gamma_i$, and $s_i$ are forwarded to said first correspondent, and $A_i$ and $\gamma_i$ are forwarded to said second correspondent.

18. A method as defined in claim 16, wherein said distinguishing feature includes at least one of a name of said first correspondent, a telephone number of said first correspondent, and an address of said first correspondent.

19. A method as defined in claim 16, wherein said transaction specific information includes at least one of a time of said transaction and a date of said transaction.

20. A method as defined in claim 17, wherein said ephemeral private key is generated according to $a_i = k + s_i$, where $a_i$ is said ephemeral private key.

21. A method as defined in claim 20, wherein said ephemeral public key is recovered according to $a_i P = \gamma_i - H(A_i, \gamma_i) \cdot cP$, where $a_i P$ is said ephemeral public key and $cP$ is said certifying authority's public key.

22. A method as defined in claim 21, wherein said certifying authority verifies the validity of said certificate attributed to said first correspondent by checking a list for determining if said certificate has been revoked.

23. A method as defined in claim 21, wherein said ephemeral private key is said transaction specific private key and said ephemeral public key is said transaction specific public key.

24. A method as defined in claim 15, wherein said generated implicit signature components include a parameter for indicating a predetermined permission for said first correspondent, said second correspondent granting access to said first correspondent according to said predetermined permission upon verification of said signature.

25. A method as defined in claim 15, wherein
said second component is $\gamma_A$, where $\gamma_A = aP + c_A P$, and where aP is a long term public key of said first correspondent, $c_A$ is a random integer generated by said certifying authority, and P is a point on a curve; and
said third component is $s_A$, where $s_A = h(\gamma_A \| A_i \| cP) c + c_A$ (mod n), and where said first component is $A_i$ and includes at least one distinguishing feature of said first correspondent, where c is a long term private key of said certifying authority, n is a large prime number, and h indicates a secure hash function.

26. A method as defined in claim 23, wherein $\gamma_A$ and $s_A$ are forwarded to said first correspondent, and $A_i$ and $\gamma_A$ are forwarded to said second correspondent by said first correspondent.

27. A method as defined in claim 25, wherein said distinguishing feature includes at least one of a name of said first correspondent, a telephone number of said first correspondent, and an address of said first correspondent.

28. A method as defined in claim 25, wherein said transaction specific information includes at least one of a time of said transaction and a date of said transaction.

29. A method as defined in claim 26, wherein said ephemeral private key is generated according to $d = a + s_A$, where d is said ephemeral private key.

30. A method as defined in claim 29, wherein said ephemeral public key is recovered according to $Q_A = h(\gamma_A \| A_i \| \| Q_C) Q_C + \gamma_A$, where $Q_A$ is said ephemeral public key and $Q_C$ is said certifying authority's long term public key.

31. A method as defined in claim 30, wherein said certifying authority recertifies said certificate attributed to said first correspondent by changing said random integer, $c_A$.

32. A method as defined in claim 30, wherein said ephemeral private key is said transaction specific private key and said ephemeral public key is said transaction specific public key.

33. A method as defined in claim 15, wherein said generated implicit signature components include:
a) i, where i is a certification period;
b) said third component is $s_A$, where $s_{A_i} = r_i c + k_i + c_A$ (mod n), n is a large prime number, c is a long term private key of said certifying authority, $c_A$ and $k_i$ are random integers, and $r_i = h(\gamma_A \| A_i \| cP \| k_i P \| i)$, where said first component is $A_i$ and includes at least one distinguishing feature of said correspondent and said specific authorization information, P is a point on a curve, and h indicates a secure hash function;
wherein said second component is $\gamma_A = aP + c_A P$, and where aP is a long term public key of said correspondent and $\gamma_A$ has previously been determined by said certifying authority and forwarded to said correspondent.

34. A method as defined in claim 33, wherein i and $s_A$ are forwarded to said first correspondent, and $A_i$ and $\gamma_A$ are forwarded to said second correspondent by said first correspondent.

35. A method as defined in claim 33, wherein said distinguishing feature includes at least one of a name of said first correspondent, a telephone number of said first correspondent, and an address of said first correspondent.

36. A method as defined in claim 33, wherein said transaction specific information includes at least one of a time of said transaction and a date of said transaction.

37. A method as defined in claim 34, wherein said ephemeral private key is generated according to $d_i = a + s_{A_i}$, where $d_i$ is said ephemeral private key.

38. A method as defined in claim 37, wherein said ephemeral public key is recovered according to $Q_A = r_i Q_C + \gamma_A + Q_i$, where $Q_A$ is said ephemeral public key, $Q_i$ is said certifying authority's certification period public key, and $Q_C$ is said certifying authority's long term public key.

39. A method as defined in claim 38, wherein said certifying authority recertifies said certificate attributed to said first correspondent for each certification period, i, by changing said random integer, $k_i$.

40. A method as defined in claim 38, wherein said ephemeral private key and said ephemeral public key have a predetermined period of validity.

41. A method as defined in claim 40, wherein said predetermined period of validity is one transaction.

42. A method as defined in claim 40, wherein said predetermined period of validity is a predetermined number of transactions.

43. A method as defined in claim 40, wherein said predetermined period of validity is a predetermined time period.

44. A certifying authority for enabling a transaction between a first and second correspondent over a data communication system to be verified, said certifying authority having control of a public key's validity, said public key being used by at least said first correspondent, said certifying authority comprising a cryptographic unit configured for:
   a) receiving from one of said first and second correspondents, a request that said public key be validated;
   b) verifying the validity of said public key attributed to said first correspondent;
   c) generating implicit certificate components including a first component comprising transaction specific information particular to said request in step a), a second component computed using said public key of said first correspondent, and a third component computed from said first and second components and a private key of said certifying authority;
   d) having forwarded to said first correspondent, at least said third component of said implicit certificate components for permitting said first correspondent to generate a transaction specific private key using said third component; and
   e) having forwarded to said second correspondent at least said first and second components of said implicit certificate components for permitting recovery of a transaction specific public key corresponding to said transaction specific private key using said first and second components and a public key of said certifying authority;
wherein said first correspondent can sign a message with said transaction specific private key, forward said message to said second correspondent, and said second correspondent can attempt to verify said message using said transaction specific public key to proceed with said transaction upon verification.

45. A certifying authority as defined in claim 44, wherein said at least one of said implicit signature components is forwarded to said second correspondent by said certifying authority.

46. A certifying authority as defined in claim 44, wherein said second component is $\gamma_i$, where $\gamma_i = kP + rP$, and where k is a long term private key of said first correspondent, r is a random integer generated by said certification authority, and P is a point on a curve; and said third component is $s_i$, where $s_i = r - c \cdot H(A_i, \gamma_i)$, and where c is a long term private key of said certifying authority, said first component is $A_i$ and includes at least one distinguishing feature of said first correspondent and said transaction specific information, and H indicates a secure hash function;
wherein said long term private key of said first correspondent is sent to said certifying authority prior to said verification transaction.

47. A certifying authority as defined in claim 44, wherein said transaction specific information includes at least one of a time of said transaction and a date of said transaction.

48. A certifying authority as defined in claim 44, wherein said certifying authority verifies the validity of said public key attributed to said first correspondent by checking a list for determining if a certificate therefor has been revoked.

49. A certifying authority as defined in claim 44, wherein said generated implicit signature components include a parameter for indicating a predetermined permission for said first correspondent, wherein said second correspondent can grant access to said first correspondent according to said predetermined permission upon verification of said signature.

50. A certifying authority as defined in claim 46, wherein said certifying authority recertifies said certificate attributed to said first correspondent by changing said random integer, $c_A$.

51. A certifying authority as defined in claim 44, wherein said generated implicit signature components include:
   a) i, where i is a certification period;
   b) said third component is $s_A$, where $s_A = r_i c + k_i + c_A \pmod{n}$, n is a large prime number, c is a long term private key of said certifying authority, $c_A$ and $k_i$ are random integers, and $r_i = h(\gamma_A \| A_i \| cP \| k_i P \| i)$, where said first component is $A_i$ and includes at least one distinguishing feature of said correspondent and said specific authorization information, P is a point on a curve, and h indicates a secure hash function;
wherein said second component is $\gamma_A = aP + c_A P$, and where aP is a long term public key of said correspondent and $\gamma_A$ has previously been determined by said certifying authority and forwarded to said correspondent.

52. A certifying authority as defined in claim 51, wherein said certifying authority recertifies said certificate attributed to said first correspondent for each certification period, i, by changing said random integer, $k_i$.

* * * * *